(12) United States Patent
Lei et al.

(10) Patent No.: US 12,724,220 B2
(45) Date of Patent: Sep. 1, 2026

(54) ADJUSTMENT METHOD AND ADJUSTMENT APPARATUS FOR MUTUAL PARALLELISM OF TWO BACK-TO-BACK GRATINGS

(71) Applicant: Shanghai Institute of Measurement and Testing Technology, Shanghai (CN)

(72) Inventors: Lihua Lei, Shanghai (CN); Lijie Liang, Shanghai (CN); Yujie Zhang, Shanghai (CN); Yuqing Guan, Shanghai (CN); Yaoqiong Shen, Shanghai (CN); Liqin Liu, Shanghai (CN); Wenzhe Zou, Shanghai (CN); Chuangwei Guo, Shanghai (CN); Yunxia Fu, Shanghai (CN)

(73) Assignee: Shanghai Institute of Measurement and Testing Technology, Shanghai (CN)

( * ) Notice: Subject to any disclaimer, the term of this patent is extended or adjusted under 35 U.S.C. 154(b) by 329 days.

(21) Appl. No.: 18/530,407

(22) Filed: Dec. 6, 2023

(65) Prior Publication Data

US 2024/0393560 A1 Nov. 28, 2024

(30) Foreign Application Priority Data

May 24, 2023 (CN) ........................ 202310592376.5

(51) Int. Cl.
*G02B 7/00* (2021.01)
*G02B 5/18* (2006.01)
*G02B 27/44* (2006.01)

(52) U.S. Cl.
CPC .......... *G02B 7/003* (2013.01); *G02B 5/1861* (2013.01); *G02B 27/44* (2013.01)

(58) Field of Classification Search
None
See application file for complete search history.

(56) References Cited

U.S. PATENT DOCUMENTS 5,170,221 A * 12/1992 Matsui .................. G01J 1/4257 250/237 G
5,280,338 A * 1/1994 Drozdowicz ............ G01J 3/02 356/334

(Continued)

OTHER PUBLICATIONS

Zhu et al. Alignment method based on matched dual-grating moire fringe for proximity lithography, Nov. 2012, 5(11), 113603-1 to113603-9 (Year: 2012).*

(Continued)

*Primary Examiner* — Robert E. Tallman
(74) *Attorney, Agent, or Firm* — Robinson & Cole LLP

(57) ABSTRACT

The application provides an adjustment method and an adjustment apparatus for mutual parallelism of two back-to-back gratings, including parallelism adjustment of grating surfaces of the two gratings and parallelism adjustment of grating lines of the two gratings. Wherein a first grating and a second grating respectively disposed on both sides of the grating mounting plate are adjusted to be perpendicular to the same horizontal collimated light source respectively, so as to achieve the parallelism adjustment of the grating surfaces of the two gratings; light is emitted by a red light source, diffraction patterns formed by two gratings are displayed on a screen, more diffraction light spots are marked respectively, then marks are connected, and a mark connecting line of the first grating is adjusted to be parallel to a mark connecting line of the second grating, thereby completing the parallelism adjustment of the grating lines of the two gratings.

12 Claims, 3 Drawing Sheets

(56) References Cited

U.S. PATENT DOCUMENTS

| | | | | |
|---|---|---|---|---|
| 5,568,257 | A * | 10/1996 | Ota | G03F 9/70<br>356/490 |
| 2004/0233438 | A1 * | 11/2004 | Kobayashi | G02B 27/62<br>359/566 |

OTHER PUBLICATIONS

Chen et al., "Extended dual-grating alignment method for optical projection lithography", Applied Optics, vol. 49 No 4, 708-713, Feb. 2010 (Year: 201).*

Liu et al. "Compression grating alignment be far-field monitoring", Applied physics B, 101, 587-591, 2010 (Year: 2010).*

* cited by examiner

ADJUSTMENT METHOD AND ADJUSTMENT APPARATUS FOR MUTUAL PARALLELISM OF TWO BACK-TO-BACK GRATINGS

CROSS-REFERENCE TO RELATED APPLICATIONS

This application claims the priority to Chinese Patent Application No. 202310592376.5, filed on May 24, 2023, now CN Patent No. 116560028B, granted Aug. 26, 2025, the disclosure of which is incorporated herein by reference in its entirety.

TECHNICAL FIELD

The present application relates to a grating measurement system component, and in particular to an adjustment method and adjustment apparatus for mutual parallelism of two back-to-back gratings, which are applied to a grating period measurement system.

BACKGROUND

In a process of measuring a period of ordinary gratings by using standard gratings with known a period, in order to reduce an error, it is necessary to place two gratings back-to-back and parallel on the same sample plate.

In the prior art, most studies focus on how to adjust parallelism of a face-to-face grating pair. As shown in FIG. 1, a collimated light source 6 and a right angle prism 12, are used, and the right angle prism 12 is used to adjust the mutual parallelism of the grating pair. In a first step, the collimated light source 6 is placed at the position of a dashed line in the figure, the collimated light source 6 is adjusted so that light passes through a pinhole diaphragm 5 and then enters a first grating A and returns to the pinhole diaphragm 5, that is, the collimated light source 6 is adjusted to be perpendicular to the first grating A, and the height of the light emitted from the collimated light source 6 and passing through the pinhole diaphragm 5 is marked with a height mark 13. In a second step, the right angle prism 12 is placed between the collimated light source 6 and the first grating A (at the position of the dashed line in the figure), and is adjusted so that the light emitted by the collimated light source 6 returns to the pinhole diaphragm 5 after reflected by a first right angle surface of the right angle prism 12, that is, the light emitted by the collimated light source 6 is adjusted to be perpendicular to the first right angle surface of the right angle prism 12, and the right angle prism 12 is horizontally adjusted slightly so that the height of a beam emergent from a second right angle surface of the right angle prism 12 is strictly consistent with the height indicated by the height mark 13. In a third step, the collimated light source 6 and the pinhole diaphragm 5 are moved to directly irradiate the second right angle surface of the right angle prism 12 (at the position of the dashed line in the figure), the collimated light source 6 is adjusted so that the light of the collimated light source 6 returns to a pinhole of the pinhole diaphragm 5 after reflected by the second right angle surface of the right angle prism 12, that is, the direction of the emitted light of the collimated light source 6 is adjusted to be parallel to the first grating A. In a fourth step, the right angle prism 12 is translated toward the collimated light source 6, so that the light emergent from the first right angle surface of the right angle prism 12 can irradiate a second grating B (at this time, the right angle prism 12 is located at the position of a solid line in the figure), while ensuring that the light emitted by the collimated light source 6 always returns to the pinhole of the pinhole diaphragm 5 after reflected by the second right angle surface of the right angle prism 12. In a fifth step, the second grating B is adjusted, so that the light emitted by the collimated light source 6 irradiates the second grating B after refracted by the right angle prism 12 and returns to the pinhole of the pinhole diaphragm 5 after reflected by the right angle prism 12. As such, the first grating A is parallel to the second grating B.

However, the above technology can only prove that grating surfaces of the two gratings are parallel and cannot guarantee that grating lines of the two gratings are parallel. Since the principle of measuring the grating period is based on vector displacements of the standard grating and the ordinary grating in the period direction, in order to make a measurement result more accurate, it is necessary to ensure that the two gratings have the same vector displacement. Therefore, ensuring that the two gratings have the same pitch angle, same deflection angle, and same rotation angle, that is, the two gratings are completely parallel, is particularly important to the accuracy of the measurement system.

BRIEF SUMMARY

The objective of the present application is to solve the defect of the prior art by designing an adjustment method and adjustment apparatus for mutual parallelism of two back-to-back gratings, wherein parallelism adjustment of grating surfaces and parallelism adjustment of grating lines of a grating pair are completed in two steps, which are applicable to parallelism adjustment of two back-to-back gratings, with a small error, high accuracy, and strong reliability. The above two steps can also be carried out by two workers simultaneously, thereby reducing adjustment work time.

The present application is implemented as follows: an adjustment method for mutual parallelism of two back-to-back gratings, including parallelism adjustment of grating surfaces of the two back-to-back gratings and parallelism adjustment of grating lines of the two back-to-back gratings, using an adjustment apparatus including a first grating A, a second grating B, a red light source, a receiving screen, a grating mounting plate, a pinhole diaphragm, a collimated light source, threaded structures disposed at four corners of each of the gratings, and a telescopic groove rotation mechanism used for connection and mounting of the gratings on the grating mounting plate, wherein the first grating A and second grating B respectively disposed on both sides of the grating mounting plate are adjusted to be perpendicular to the same horizontal collimated light source by means of the pinhole diaphragm, the collimated light source, and the threaded structures, so as to achieve parallelism of the grating surfaces of the first grating A and the second grating B; the grating lines of the two back-to-back gratings are adjusted to be parallel by means of the red light source, the receiving screen, and the telescopic groove rotation mechanism, wherein light of the red light source is perpendicularly incident on the first grating A and the second grating B respectively, two or more diffraction light spots displayed by the first grating A and the second grating B respectively on the receiving screen are marked, marks of respective gratings are connected respectively to form two lines, the first grating A is rotated with the telescopic groove rotation mechanism as a center until a mark connecting line of the diffraction light spots formed by the first grating A on the receiving screen is parallel to a mark connecting line of the diffraction light spots formed by the second grating B, thereby achieving parallelism of the grating lines of the first grating A and the second grating B; during an adjustment process, the position of the collimated light source and the direction of emitted light remain unchanged.

The adjustment apparatus for performing the parallelism adjustment of the grating surfaces of the two back-to-back gratings further includes a rotation control table; first, the collimated light source is adjusted to be in a horizontal emission state, the position of the collimated light source is fixed, then the two gratings are mounted on both sides of the grating mounting plate, light of the collimated light source is incident to the first grating A via the pinhole diaphragm, a deflection angle or pitch angle of the first grating A is adjusted by means of the threaded structures at four corners of the first grating A, so that reflected light returns via the pinhole diaphragm, and at this time, the first grating A is perpendicular to the horizontal collimated light source; next, the rotation control table is rotated by 180°, light of the collimated light source is incident to the second grating B via the pinhole diaphragm, a deflection angle or pitch angle of the second grating B is adjusted by means of the threaded structures at four corners of the second grating B, so that reflected light returns via the pinhole diaphragm, and at this time, the second grating B is also perpendicular to the horizontal collimated light source, thereby completing the parallelism adjustment of the grating surfaces of the two gratings.

The adjustment apparatus for performing the parallelism adjustment of the grating lines of the two back-to-back gratings further includes a rotation control table; first, an incident light angle of the red light source is fixed and adjusted so that the light is incident on the second grating B, diffraction patterns are displayed on the receiving screen, two or more diffraction light spots are marked, and marks are connected into a line; then the rotation control table is rotated by 180°, the light emitted by the red light source is incident on the first grating A, diffraction patterns are also displayed on the receiving screen, two or more diffraction light spots are also marked, and marks are connected into a second line; the first grating A is rotated by means of the telescopic groove rotation mechanism until the two mark connecting lines displayed on the receiving screen are parallel, thereby completing the parallelism adjustment of the grating lines of the two gratings.

An adjustment apparatus used by the adjustment method for mutual parallelism of two back-to-back gratings includes a first grating A, a second grating B, a red light source, a receiving screen, a grating mounting plate, a pinhole diaphragm, a collimated light source, threaded structures disposed at four corners of each of the gratings, and a telescopic groove rotation mechanism used for connection and mounting of the gratings on the grating mounting plate; the red light source and the grating mounting plate are placed on the surface of a workbench; the telescopic groove rotation mechanism is a two-segment sleeve structure, with one segment tube body being fixed in a region of the grating mounting plate that is used for mounting the gratings, the other segment tube body being adhered to the gratings, and both segment tube bodies being provided with mutually matching clamping structures; the first grating A and the second grating B are clamped respectively by the respective clamping structures of the two segment tube bodies of the telescopic groove rotation mechanism and then mounted on both sides of the grating mounting plate; the collimated light source and the pinhole diaphragm are located on one side of the grating mounting plate, and the receiving screen is located on the other side of the grating mounting plate.

The adjustment apparatus further includes a rotation control table placed on the surface of the workbench, and the grating mounting plate is vertically placed on a flat top surface of the rotation control table. The receiving screen is a wall or a screen capable of receiving light spots.

The first grating A and the second grating B both are detachable gratings, respective angle rotation is achieved via the telescopic groove rotation mechanism, and angle adjustment of respective deflection angle or pitch angle is achieved via the threaded structures disposed respectively at four corners. The two segment tube bodies of the telescopic groove rotation mechanism are sleeve connected via the clamping structures, the clamping structures are several clamping bosses disposed on an inner wall of an outer segment tube body and several clamping bosses disposed correspondingly on the outer circumference of an inner segment tube body for cooperation, the two segment tube bodies are sleeve connected via positional matching between the several clamping bosses, the clamping bosses disposed on the outer circumference of the inner segment tube body abut on the inner wall of the outer segment tube body, and the two segment tube bodies perform a relative rotation motion under an external force and leave a space for mutual telescopic motion after being sleeve connected.

The present application has the following beneficial effects: the present application is applicable to the parallelism adjustment of the two back-to-back gratings, with a simple apparatus structure and easily understandable principle. The parallelism adjustment of the gratings is achieved by completing the parallelism adjustment of the grating surfaces of the gratings and the parallelism adjustment of the grating lines of the gratings, with easy implementation and convenient operations. Furthermore, the above two steps can be performed by two workers simultaneously, with short time consumption and high efficiency. The apparatus of the present application has a low environmental requirement, a small error, and strong reliability.

In the figures: A. first grating; B. second grating; 1. red light source; 2. receiving screen; 3. rotation control table; 4. grating mounting plate; 5. pinhole diaphragm; 6. collimated light source; 7. first threaded structure; 8. second threaded structure; 9. third threaded structure; 10. fourth threaded structure; 11. telescopic groove rotation mechanism; 12. right angle prism; 13. height mark; 14. clamping boss.

DETAILED DESCRIPTION OF THE DISCLOSURE

The present application is further described below in conjunction with the drawings and specific embodiments. The embodiments are implemented based on the technical solutions of the present application, and detailed implementations and specific operation processes are provided. However, the protection scope of the present application is not limited to the following embodiments.

Figure 1:
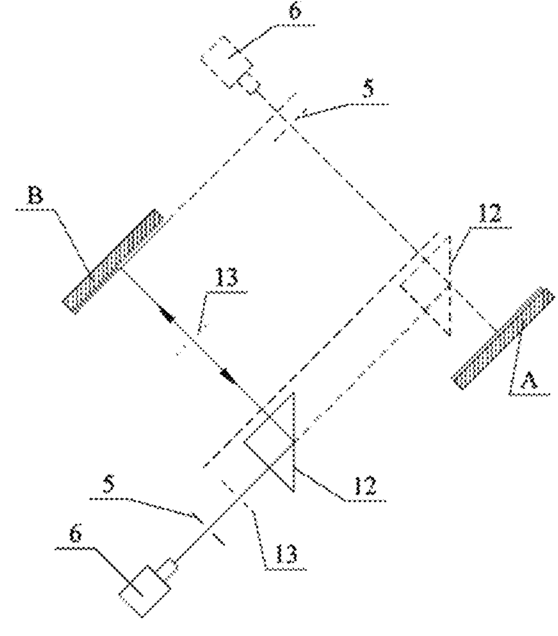
FIG. 1 is a simplified schematic diagram of an adjustment apparatus and adjustment mode for achieving mutual parallelism of two face-to-face gratings in the prior art.
Figure 2:
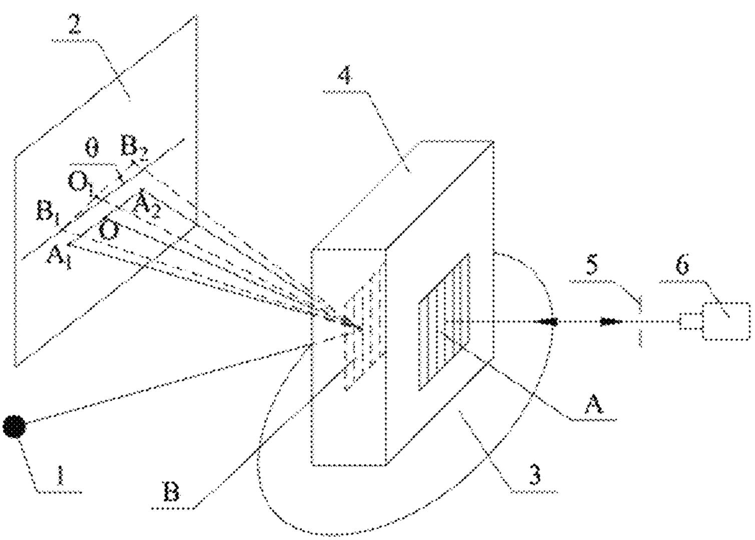
FIG. 2 is a simplified schematic diagram of a structure of the adjustment apparatus according to the present application.
Figure 3:
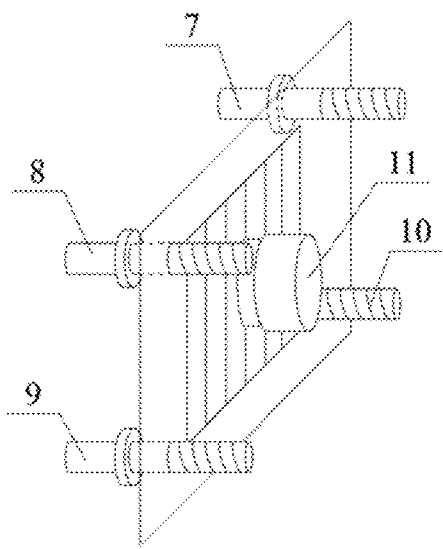
FIG. 3 is a simplified schematic diagram of a distribution of threaded structures and a telescopic groove rotation mechanism for adjusting grating angles according to the present application.

Referring to FIGS. 2 and 3, the present application provides an adjustment method and adjustment apparatus for mutual parallelism of two back-to-back gratings. The adjustment apparatus of the present application includes a first grating A, a second grating B, a red light source 1, a receiving screen 2, a rotation control table 3, a grating mounting plate 4, a pinhole diaphragm 5, a collimated light source 6, a first threaded structure 7, a second threaded structure 8, a third threaded structure 9, a fourth threaded structure 10, and a telescopic groove rotation mechanism 11. The red light source 1 and the rotation control table 3 are placed on the surface of a workbench respectively, and the grating mounting plate 4 is vertically placed on a flat top surface of the rotation control table 3. The rotation control table 3 can perform a horizontal rotation motion on the workbench. The telescopic groove rotation mechanism 11 is a two-segment sleeve structure, with one segment tube body being fixed in a region of the grating mounting plate 4 that is used for mounting the gratings, the other segment tube body being adhered to the gratings, and both segment tube bodies being provided with mutually matching clamping structures. The first grating A and the second grating B are clamped respectively by the respective clamping structures of the two segment tube bodies of the telescopic groove rotation mechanism and then mounted on both sides of the grating mounting plate 4. The two segment tube bodies of the telescopic groove rotation mechanism are sleeve connected. The clamping structures are several clamping bosses 14 disposed on an inner wall of an outer segment tube body and several clamping bosses 14 disposed correspondingly on the outer circumference of an inner segment tube body for cooperation. The two segment tube bodies are sleeve connected via positional matching between the several clamping bosses 14. The clamping bosses 14 disposed on the outer circumference of the inner segment tube body abut on the inner wall of the outer segment tube body, and the two segment tube bodies perform a relative rotation motion under an external force and leave a space for mutual telescopic motion after being sleeve connected. As such, the first grating A and the second grating B can respectively undergo adjustment of rotation angles around the telescopic groove rotation mechanism 11. Both of the gratings are detachable, and four threaded structures (i.e., the first threaded structure 7, the second threaded structure 8, the third threaded structure 9, and the fourth threaded structure 10) are disposed respectively at four corners of each of the first grating A and the second grating B. Angle adjustment of a deflection angle or pitch angle of the first grating A and the second grating B can be achieved by tightening or loosening nuts on the threaded structures. The collimated light source 6 and the pinhole diaphragm 5 are located on one side of the grating mounting plate 4, and the receiving screen 2 is located on the other side of the grating mounting plate 4.

In the adjustment method for mutual parallelism of two back-to-back gratings of the present application, parallelism of grating surfaces of the first grating A and the second grating B is achieved by adjusting the first grating A and the second grating B to be perpendicular to the horizontal collimated light source 6 respectively. During an adjustment process, the position of the collimated light source is fixed, and the direction of emitted light also remain unchanged. Light of the red light source 1 is perpendicularly incident on the first grating A and the second grating B respectively, two or more diffraction light spots displayed by the first grating A and the second grating B respectively on the receiving screen 2 are marked, marks of respective gratings are connected respectively to form two lines, the first grating A is rotated with the telescopic groove rotation mechanism 11 as a center until a mark connecting line of the diffraction light spots formed by the first grating A on the receiving screen 2 is parallel to a mark connecting line of the diffraction light spots formed by the second grating B, thereby achieving parallelism of the grating lines of the first grating A and the second grating B.

Figure 4:
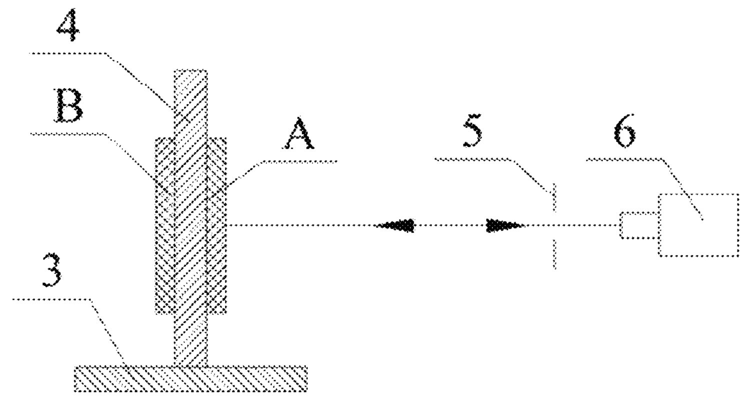
FIG. 4 is a simplified schematic diagram of components for parallelism adjustment of grating surfaces of the two back-to-back gratings and an adjustment mode according to the present application.

The adjustment method of the present application is as follows:

Referring to FIG. 4, a module for parallelism adjustment of the grating surfaces of the two back-to-back gratings includes the first grating A, the second grating B, the rotation control table 3, the grating mounting plate 4, the pinhole diaphragm 5, and the collimated light source 6. First, the collimated light source is adjusted to emit light in a horizontal emission state, and the position of the collimated light source 6 is fixed. Then the two gratings are mounted on both sides of the grating mounting plate 4, the light of the collimated light source 6 is incident to the first grating A via the pinhole diaphragm 5, a deflection angle or pitch angle of the first grating A is adjusted so that reflected light returns via the pinhole diaphragm 5, that is, the first grating A is perpendicular to the horizontal collimated light source 6. Next, the rotation control table 3 is rotated by 180°, light of the collimated light source 6 is incident to the second grating B via the pinhole diaphragm 6, a deflection angle or pitch angle of the second grating B is adjusted so that reflected light returns via the pinhole diaphragm 5, that is, the second grating B is also perpendicular to the horizontal collimated light source 6, thereby completing the parallelism adjustment of the grating surfaces of the two gratings.

Figure 5:
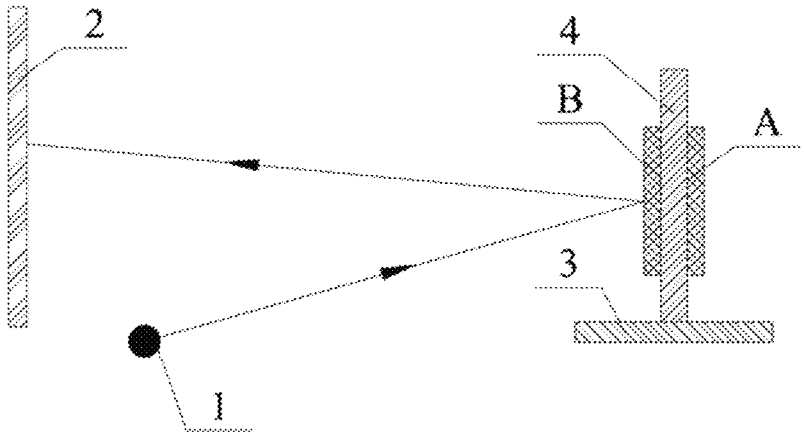
FIG. 5 is a simplified schematic diagram of components for parallelism adjustment of grating lines of the two back-to-back gratings and an adjustment mode according to the present application.

Referring to FIG. 5, a module for parallelism adjustment of the grating lines of the two back-to-back gratings includes the first grating A, the second grating B, the red light source 1, the receiving screen 2, the rotation control table 3, and the grating mounting plate 4. First, an incident light angle of the red light source 1 is fixed and adjusted so that the light is incident on the second grating B, diffraction patterns are displayed on the receiving screen 2, two or more diffraction light spots are marked, and marks are connected into a line. Then the rotation control table 3 is rotated by 180°, the light emitted by the red light source 1 is incident on the first grating A, diffraction patterns are also displayed on the receiving screen 2, two or more diffraction light spots are also marked, and marks are connected into a second line. If the grating lines of the first grating A and the second grating B are parallel, the two mark connecting lines are also parallel. If the two mark connecting lines are not parallel, the first grating A is rotated by means of the telescopic groove rotation mechanism 11 until the two mark connecting lines displayed on the receiving screen 2 are parallel, thereby completing the parallelism adjustment of the grating lines of the two gratings.

Figure 6:
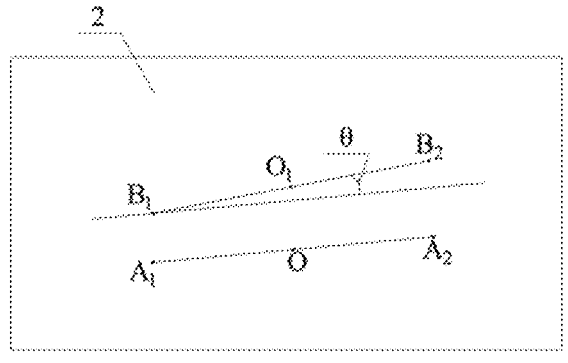
FIG. 6 is a schematic diagram of displaying diffraction light spots on a receiving screen according to the present application.
Figure 7:
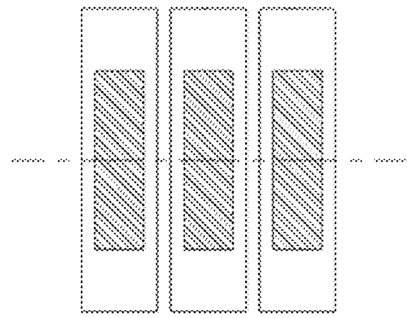
FIG. 7 is a simplified schematic diagram of a distribution of light of various wavebands in a linear array CCD when the grating lines are parallel to a linear light source.
Figure 8:
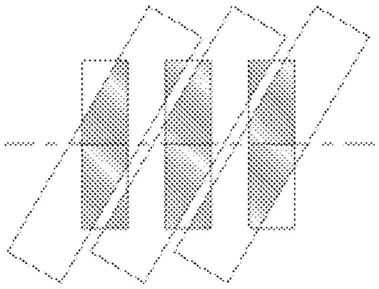
FIG. 8 is a simplified schematic diagram of a distribution of light of various wavebands in a linear array CCD when the grating lines are not parallel to a linear light source.
Figure 9:
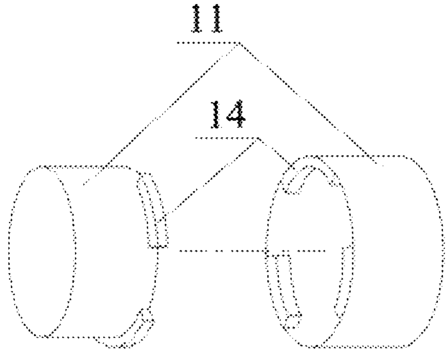
FIG. 9 is a simplified schematic diagram of a structure of the telescopic groove rotation mechanism according to the present application.

Referring to FIG. 6, $A_1OA_2$ is a diffraction pattern of the first grating A, and $B_1O_1B_2$ is a diffraction pattern of the second grating B. The incident light is perpendicular to the surface of the grating. When the grating line is not parallel to a linear light source, the position of a 0-order diffraction spectrum line remains unchanged, and +1 and −1-order diffraction light spots deviate upward and downward respectively, resulting in unequal heights and slightly approaching a central zero-order diffraction light spot. When a misalignment angle between the grating line and the linear light source increases, deviation distances of the +1 and −1-order diffraction light spots in upward and downward directions significantly increase. Optical signals are collected and analyzed by means of a linear array CCD, which is composed of an arrangement of a plurality of pixels, as shown in FIGS. 7 and 8. Arrows in the figure indicate incident directions of diffracted light of various wavebands, a small rectangle in the middle represents a pixel, and a large rectangle around it represents a diffracted light region of each waveband. Each pixel receives light of each waveband diffracted by the grating. When the grating line is parallel to the linear light source, a distribution of light of the various wavebands in the linear array CCD is as shown in FIG. 7, wherein a shaded region indicated by slashes in the figure represents an area of light received by the pixel. When the grating line is not parallel to the linear light source, a distribution of light of the various wavebands in the linear array CCD is as shown in FIG. 8, where one pixel simultaneously receives optical signals of two or more wavebands, and as shown in FIG. 8, an area of light received by each pixel is reduced compared to the area of light received in FIG. 7, resulting in a reduction in the received light intensity.

The preferable specific embodiments of the present application are described above in detail. It should be understood that a person of ordinary skills in the art can make many modifications and changes based on the concept of the present application without inventive effort. Therefore, any technical solution that can be obtained by a person skilled in the art according to the concept of the present application based on the existing technology through logical analysis, reasoning, or limited experiments shall fall within the scope of protection determined by the claims.

What is claimed is:

1. An adjustment method for mutual parallelism of two back-to-back gratings, comprising parallelism adjustment of grating surfaces of the two back-to-back gratings and parallelism adjustment of grating lines of the two back-to-back gratings, and comprising the following steps:

S11) fixedly disposing a collimating light source that can emit horizontal collimating light backward on the surface of a workbench, and disposing a pinhole diaphragm behind the collimated light source;

S12) placing a rotation control table on the surface of the workbench behind the pinhole diaphragm, with a lower end of a grating mounting plate being fixedly mounted to the rotation control table and rotatable around a vertical axis; fixedly fitting a first grating A and a second grating B back to back to both sides of the grating mounting plate, with the first grating A and/or second grating B being rotatable around an axis perpendicular to both sides of the grating mounting plate;

S13) rotating the grating mounting plate so that the first grating A faces the pinhole diaphragm and horizontal collimated light emitted by the collimated light source backward passes through the pinhole diaphragm to be incident on the first grating A, and adjusting a deflection angle or pitch angle of the first grating A so that reflected light returns via the pinhole diaphragm, that is, the first grating A is perpendicular to the horizontal collimated light;

then rotating the grating mounting plate so that the second grating B faces the pinhole diaphragm and horizontal collimated light emitted by the collimated light source backward passes through the pinhole diaphragm to be incident on the second grating B, and adjusting a deflection angle or pitch angle of the second grating B so that reflected light returns via the pinhole diaphragm, that is, the second grating B is perpendicular to the horizontal collimated light, thereby achieving parallelism adjustment of the grating surfaces of the two gratings;

S14) fixedly disposing a red light source and a receiving screen on an upper side of the surface of the workbench behind the rotation control table, wherein the red light source emits forward infrared light;

S15) rotating the grating mounting plate so that the first grating A faces the red light source and is perpendicular to the infrared light, wherein a diffraction pattern is displayed on the receiving screen by marking two or more diffraction light spots and connecting marks into a line as the diffraction pattern of the first grating A;

rotating the grating mounting plate so that the second grating B faces the red light source and is perpendicular to the infrared light, wherein a diffraction pattern is displayed on the receiving screen by marking two or more diffraction light spots and connecting marks into a line as the diffraction pattern of the second grating B;

S16) if the diffraction pattern of the first grating A is not parallel to the diffraction pattern of the second grating B, proceeding to step S17); if the diffraction pattern of the first grating A is parallel to the diffraction pattern of the second grating B, skipping to step S18);

S17) rotating the first grating A or the second grating B, and returning to step S15); and S18) completing the parallelism adjustment of the grating lines of the two gratings.

2. The adjustment method for mutual parallelism of two back-to-back gratings according to claim 1, wherein:

the first grating A and the second grating B are fixedly fitted on both sides of the grating mounting plate by means of a telescopic groove rotation mechanism;

the telescopic groove rotation mechanism is a two-segment sleeve structure, with one end of an inner segment tube body being fixed in a region of the grating mounting plate that is used for mounting the gratings, one end of an outer segment tube body being fixedly mounted to the gratings, and clamping structures that cooperate with each other being disposed respectively on the other end of the inner segment tube body and on the other end of the outer segment tube body;

the first grating A and the second grating B are clamped respectively by the respective clamping structures of the two segment tube bodies of the telescopic groove rotation mechanism and then mounted on both sides of the grating mounting plate.

3. The adjustment method for mutual parallelism of two back-to-back gratings according to claim 2, wherein:

a plurality of outer clamping bosses are evenly disposed on an outer wall of the other end of the inner segment tube body along the circumferential direction;

a plurality of inner clamping bosses are evenly disposed correspondingly on an inner wall of the other end of the outer segment tube body along the circumferential direction for cooperation;

the inner segment tube body and the outer segment tube body are sleeve connected via matching between the plurality of clamping bosses, the plurality of outer clamping bosses of the inner segment tube body abut on the inner wall of the outer segment tube body, and the inner segment tube body and the outer segment tube body can perform a relative rotation motion under an external force.

4. The adjustment method for mutual parallelism of two back-to-back gratings according to claim 2, wherein:

an outer end of the outer segment tube body is used for fixedly adhering to the gratings.

5. The adjustment method for mutual parallelism of two back-to-back gratings according to claim 2, wherein:

four threaded structures are disposed respectively at four corners of each of the first grating A and the second grating B;

one end of the threaded structures can abut onto the grating mounting plate by tightening nuts on the threaded structures;

angle adjustment of a deflection angle or pitch angle of the first grating A and the second grating B can be achieved by tightening or loosening the nuts on the threaded structures.

6. The adjustment method for mutual parallelism of two back-to-back gratings according to claim 2, wherein:

the receiving screen is a wall or a screen capable of receiving light spots.

7. An adjustment apparatus for mutual parallelism of two back-to-back gratings, comprising a collimated light source, a pinhole diaphragm, a rotation control table, a grating mounting plate, a red light source, a receiving screen, and a telescopic groove rotation mechanism; wherein:

the collimating light source is fixedly disposed on the surface of a workbench and can emit horizontal collimated light backward;

the pinhole diaphragm is disposed on an upper side of the surface of the workbench and behind the collimated light source, and the horizontal collimated light emitted by the collimated light source backward can pass through the pinhole diaphragm;

the rotation control table is placed on the surface of the workbench behind the pinhole diaphragm;

a lower end of the grating mounting plate is fixedly mounted to the rotation control table and rotatable around a vertical axis;

one side of the grating mounting plate is used for fixedly fitting a first grating A, the other side is used for fixedly fitting a second grating B, and the first grating A and/or the second grating B are rotatable around an axis perpendicular to both sides;

the red light source and the receiving screen are fixedly disposed on the upper side of the surface of the workbench behind the rotation control table;

the red light source is used to emit forward infrared light;

the receiving screen is used to display diffraction patterns of the first grating A or the second grating B vertically irradiated by the forward infrared light.

8. The adjustment apparatus for mutual parallelism of two back-to-back gratings according to claim 7, wherein:

the first grating A and the second grating B are fixedly fitted on both sides of the grating mounting plate by means of the telescopic groove rotation mechanism;

the telescopic groove rotation mechanism is a two-segment sleeve structure, with one end of an inner segment tube body being fixed in a region of the grating mounting plate that is used for mounting the gratings, one end of an outer segment tube body being fixedly mounted to the gratings, and clamping structures that cooperate with each other being disposed respectively on the other end of the inner segment tube body and on the other end of the outer segment tube body;

the first grating A and the second grating B are clamped respectively by the respective clamping structures of the two segment tube bodies of the telescopic groove rotation mechanism and then mounted on both sides of the grating mounting plate.

9. The adjustment apparatus for mutual parallelism of two back-to-back gratings according to claim 8, wherein:

a plurality of outer clamping bosses are evenly disposed on an outer wall of the other end of the inner segment tube body along the circumferential direction;

a plurality of inner clamping bosses are evenly disposed correspondingly on an inner wall of the other end of the outer segment tube body along the circumferential direction for cooperation;

the inner segment tube body and the outer segment tube body are sleeve connected via matching between the plurality of clamping bosses, the plurality of outer clamping bosses of the inner segment tube body abut on the inner wall of the outer segment tube body, and the inner segment tube body and the outer segment tube body can perform a relative rotation motion under an external force.

10. The adjustment apparatus for mutual parallelism of two back-to-back gratings according to claim 8, wherein:

an outer end of the outer segment tube body is used for fixedly adhering to the gratings.

11. The adjustment apparatus for mutual parallelism of two back-to-back gratings according to claim 8, wherein:

four threaded structures are disposed respectively at four corners of each of the first grating A and the second grating B;

one end of the threaded structures can abut onto the grating mounting plate by tightening nuts on the threaded structures;

angle adjustment of a deflection angle or pitch angle of the first grating A and the second grating B can be achieved by tightening or loosening the nuts on the threaded structures.

12. The adjustment apparatus for mutual parallelism of two back-to-back gratings according to claim 2, wherein:

the receiving screen is a wall or a screen capable of receiving light spots.

* * * * *